United States Patent [19]

Meyer

[11] 3,853,372
[45] Dec. 10, 1974

[54] WHEELCHAIR
[75] Inventor: Wilhelm Meyer, Vlotho/Weser, Germany
[73] Assignee: Wilhelm Meyer, Vlotho/Weser, Germany
[22] Filed: Feb. 23, 1973
[21] Appl. No.: 335,014

[30] Foreign Application Priority Data
Mar. 4, 1972 Germany............................ 2210492

[52] U.S. Cl................ 297/45, 297/417, 297/DIG. 4
[51] Int. Cl............................................. A47c 7/00
[58] Field of Search .......... 297/45, 44, DIG. 4, 417, 297/411, 416, 115, 422; 5/331

[56] References Cited
UNITED STATES PATENTS
| | | | |
|---|---|---|---|
| 653,321 | 7/1900 | Shackelford | 297/411 X |
| 2,486,015 | 10/1949 | Everest | 297/45 |
| 2,664,144 | 12/1953 | Johnson | 297/DIG. 4 |
| 2,858,876 | 11/1958 | Woodson | 297/417 X |
| 3,002,200 | 10/1961 | Murcoff | 5/331 |
| 3,012,255 | 12/1961 | Diehl | 5/331 |
| 3,206,249 | 9/1965 | Gateley | 297/115 X |
| 3,382,000 | 5/1968 | Sully | 5/331 X |

Primary Examiner—Francis K. Zugel

[57] ABSTRACT

A wheelchair including a chassis and side parts said chassis supporting a seat and a seat back, arms being provided on both side parts of the seat, each of the two arms forming with a side part an arm and side unit vertically adjustable in guides on the chassis and lowerable at least into a position wherein the arm supporting surface of the arm is located in a plane with the seat, the unit being lockable at the desired adjusted height, and wherein each arm and side unit is formed by an inverted U-shaped supporting stirrup, an arm secured to the cross-piece of said stirrup and a side wall secured to said supporting stirrup and extending parallel to and externally of the plane of the supporting stirrup, said arm and side unit being vertically displaceable by guides provided in first vertical guide sleeves of said chassis and is releasably securable or adjustable between limits by a locking device.

9 Claims, 8 Drawing Figures

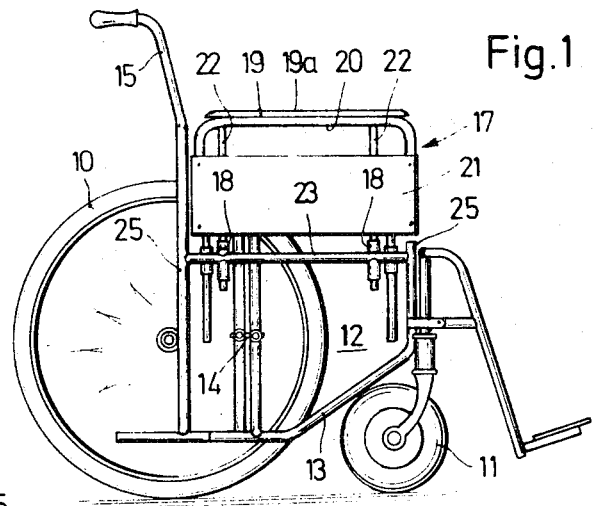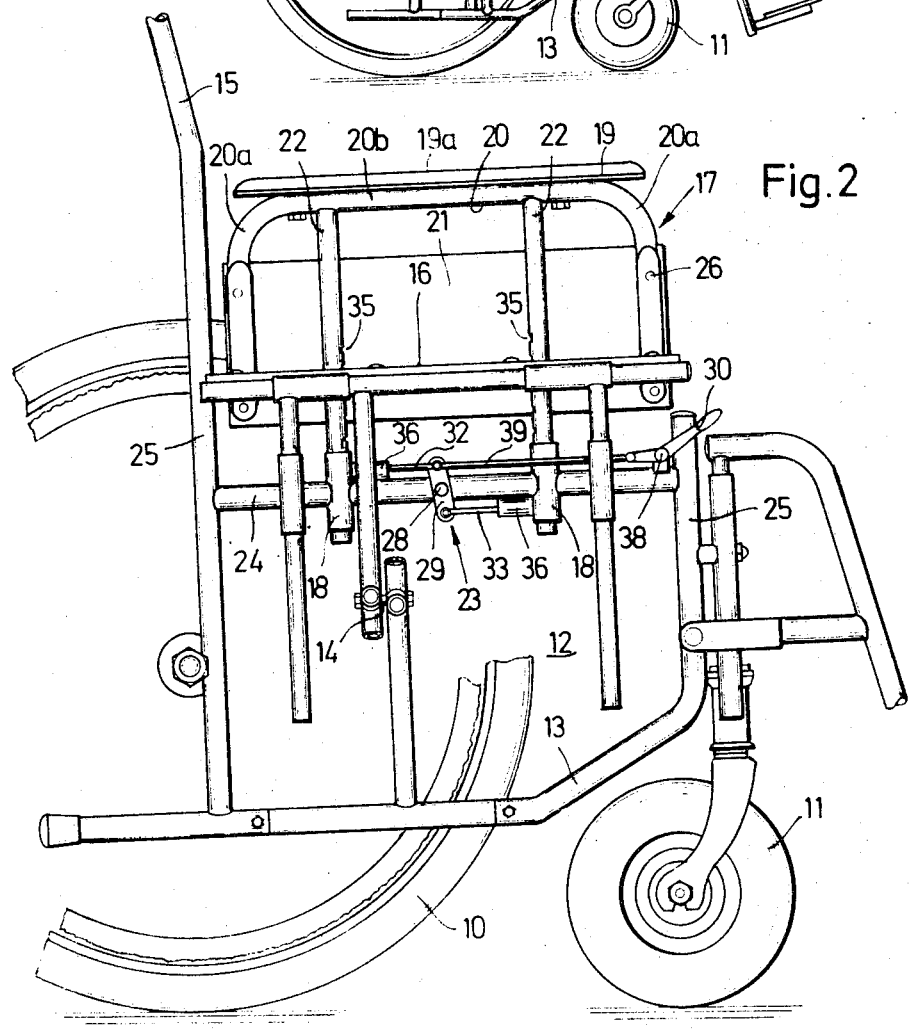

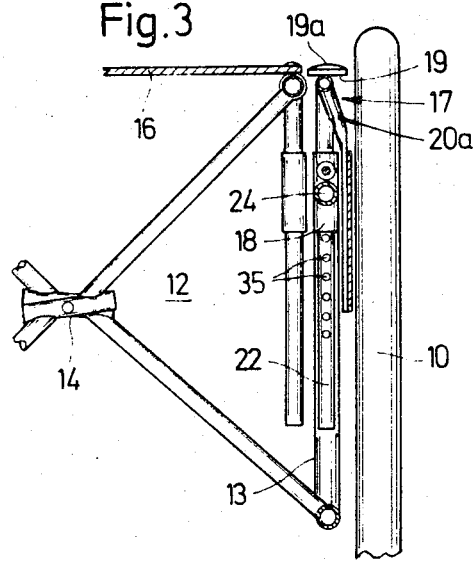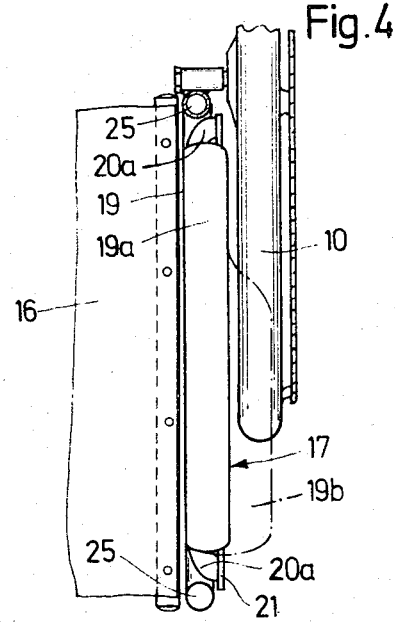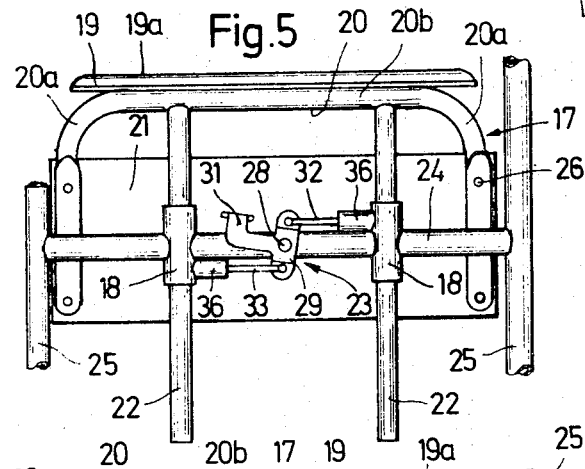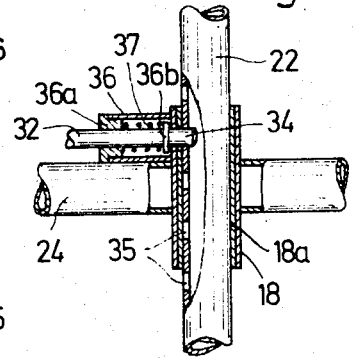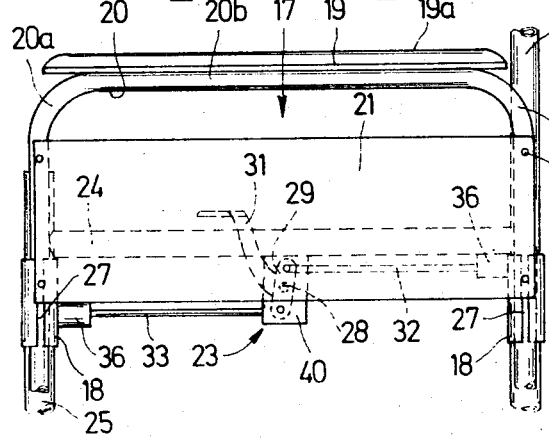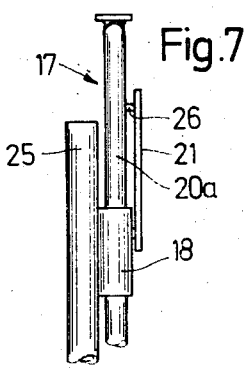

WHEELCHAIR

The present invention concerns a wheelchair comprising a chassis supporting a seat and a seat back and on which arms are provided on both sides of the seat.

Such wheelchairs are known in the prior art in different embodiments having vertically adjustable or removable arms.

In the case of wheelchairs having vertically stepwise adjustable arms, said arms are mounted on rigid side parts projecting upwardly above the seat and can be set at different levels within a certain range for different statures; however, owing to the rigid side parts, the disadvantage arises that this wheelchair cannot be brought sufficiently close to a table or the like, since the sides are of such height that they get in the way.

In the case of wheelchairs having removable arms, these arms are not vertically adjustable, thus making it impossible to adapt them to different statures; the handicapped person removes the arms and lays them aside so that he or she can get out or slip out of the chair at the side and thus the arms are not always available when the chair is to be used next.

An object of the present invention is to provide an improved wheelchair which can be brought in a simple manner close to a table or the like, allows the handicapped person to get out of the chair at the side and also affords said handicapped person an individual support for his body.

According to the present invention, there is provided a wheelchair comprising a chassis supporting a seat and a seat back, on which arms are provided on both sides of the seat, in which each of the two arms forms with a side part an arm and side unit vertically adjustable in guides on the chassis, and lowerable at least into a position wherein the arm supporting surface of the arm is located in a plane with the seat, the unit being lockable at the desired adjustable height, and wherein each arm and side unit is formed by an inverted U-shaped supporting stirrup, an arm secured to the cross piece of the stirrup and a side wall secured to the supporting stirrup and extending parallel to and externally of the plane of the supporting stirrup, said arm and side unit being vertically displaceable by guides located below the seat and releasably securable or adjustable between limits by a locking device.

The locking device associated with each arm and side unit in part extends below the seat and has a double-armed lever pivotable about a horizontal axis extending transversely to the level adjusting device and provided on a supporting beam on the chassis, said lever being connected to an actuating lever for effecting its pivotal movement and having locking rods which are pivotably mounted thereon and are displaceable in opposite directions when the lever is pivoted, and are engageable as locking pins in locking openings in the vertical guides provided at spaced intervals vertically one above the other.

It is preferable to form the arms by a padded strip having a rectangular form, said strip being provided at the front of the chair with an outwardly extending enlargement.

The wheelchair of the present invention is provided in a simple manner with vertically adjustable arms capable of being lowered to the level of the seat and each forming with a side part one unit so that the arm and side units can be adjusted individually in height to any stature (each handicapped person thereby obtaining an arm support adjustable to his arm) and may enable, by the lowering of the arm and side unit down to the height of the seat, the person to get out of the chair (slide out) easily at the side without removing the arms. The arm and side unit can be lowered to such an extent that the supporting surface of the arm is disposed in a horizontal plane with the seat and the handicapped person can then easily slip sideways from the wheelchair over onto any other surface, for example, a bed, the arm forming a bridge between the seat of the chair and the bed or the like so that the distance between these two useful surfaces is reduced and the gap can be easily crossed by the handicapped person.

The lowerable arrangement of the arms with the side parts also enables the chair to be brought close to a table or the like, since the side or the arms do not get in the way and, when lowered can pass under the table - thus the handicapped person has a comfortable and reliable position at the table, since the back of the chair and the edge of the table in contact with the body of the person and the table respectively act as a support for the body of the handicapped person and as a support for the arms of the handicapped person.

The arm and side unit need not be removed and is thus always ready for use. The level setting of the arms and side unit is simple and reliable and the locking device determining the adjusted height of the arms and seat unit is not only simple and economical to construct but also easy to manipulate - the actuating parts of the locking device are readily accessible at convenient points on the wheelchair.

The invention will be further illustrated by way of example, with reference to the accompanying drawings, in which:

FIG. 1 is a side view of a wheelchair having vertically displaceable arms provided on each side of said chair;

FIG. 2 is a side view of the same wheelchair, viewed from the inside, and showing an arm and side unit which is vertically displaceable in guides and the locking device thereof for fixing the unit at the desired level;

FIG. 3 is a front view of a part of the same wheelchair in which the arm and side unit is lowered to the level of the seat;

FIG. 4 is a plan view of a side portion of the same wheelchair;

FIG. 5 is a side view of the arm and side unit with vertical guides and a locking device;

FIG. 6 is a partial section through a vertical guide with locking pins for the locking device;

FIG. 7 is a front view of a modified arm and side unit, and

FIG. 8 is a side view of the arm and side unit according to FIG. 7.

A wheelchair in accordance with the present invention has a chassis 12 which is supported by manually-or motor-driven wheels 10 located at the sides of the wheelchair and lateral steering wheels 11 located at the front of the wheelchair, said chassis being formed of two side frames 13 secured together in spaced relationship.

The side frames 13 can be secured with a fixed space between the two frames, but are preferably provided with a variable space therebetween obtained by a universal or cardan joint 14, which enables the wheelchair to be folded up when not in use.

The chassis 12 is provided with a seat back 15 and a seat 16 — the seat 16 is formed in the foldable version of the wheelchair by a flexible member. An arm and side unit 17, which is vertically adjustable in guides 18, is mounted on both sides of the seat 16. The arm and side unit is arranged so as to be lowered, with the supporting surface 19a of the arm 19, at least into a position disposed in a plane with the seat 16 (see FIG. 3) and can be secured at the desired level (in the lowered position).

Each arm and side unit 17 is formed by an inverted U-shaped supporting stirrup 20 having shanks 20a, an arm 19 secured to the cross piece 20b of the supporting stirrup 20, preferably a padded arm, and a side wall 21 secured to the supporting stirrup 20 and extending parallel to and externally of the plane of said supporting stirrup; this arm and side unit 17 is vertically displaceable, by means of vertical guides 22 in guide sleeves 18 of the chassis 12 and securable by a locking device 23 at the desired adjusted level. The guides 18 are provided with sliding sleeves 18a for easier displacement of the guides 22 engaging therein.

In accordance with the embodiments of the vertically displaceable arm and side unit 17, according to FIGS. 1 - 6, the U-shanks 20a of the supporting stirrup 20 are bent outwardly at spaced intervals relative to the plane of vertical displacement, and are provided, on their outer side, with a side wall 21 which is secured thereto by screws, rivets 26 or the like and extends, also at a spaced interval, from the original plane of the supporting stirrup 20.

Two vertical guides 22 extending adjacent each other with a spaced interval therebetween are secured to the cross piece 20b of the stirrup 20 within the plane of said stirrup. The guides 22 displaceably engage in respective vertical guide sleeves 18 mounted on a horizontal side frame member 24 below the seat 16.

In the modified embodiment of the arm and side unit 17 shown in FIGS. 7 and 8, the U-shanks 20a form vertical guides engaging vertically displaceably in vertical guide sleeves 18 secured to vertical side frame members 25 extending in the front and rear part of the chair. The supporting stirrup 20 is provided with U-shanks 20a and the side wall 21 secured on the outside of the U-shanks 20a, by means of spacers or securing means 26, such as screws, bolts or the like is located at a spaced interval from the plane of the supporting stirrup 20. The guide sleeves 18 secured to the outsides of the side frame members 25 have a vertical outer slot 27 which extends vertically, through which slot the spacer 26 passes during the adjustment of the height of the arm and side unit with its spacers or securing means 26. Each arm and side unit 17 has an associated locking device 23 which is located below the seat 16 and has a double armed lever 29 extending transversely to the direction of displacement of the arm and side unit and which is pivotable about a horizontal axis 28 and extending into the plane of the side frame. Connected to this swivel lever 29 is an actuating lever 30 or 31 effecting its swivel movement; mounted on both ends of the swivel lever 29 are locking bars 32 and 33 which are pivotably connected to the swivel lever 29 and engage at one end with the lever 29 and form with their other free end a locking pin 34, which engages in locking openings 35 of the side guiding member 22, or 20a provided at a vertically spaced interval. The locking bar 32 and the other bar 33 extend below the frame member 24 - the two bars 32 and 33 are displaceable in opposite directions during the pivoting of the actuating lever 30, 31, and simultaneously engage in the openings 35 of the guide member or simultaneously disengage therefrom. It is preferable to make the rods 32 and 33 displaceable in a guide sleeve 36 secured to the guide sleeve 18 and disposed at a right angle thereto and, by a slide bearing provided in this sleeve 36, preferably an abutment on a sleeve bearing 36a, and a second abutment, a compression member 37, preferably a compression spring, rubber cushion or the like on an extension 36b of the locking pin 34, to keep them in the locked position or to bring them to the locked position respectively; the locking pins 34 extend through an opening in the guide sleeve 18.

The actuating lever 31 according to FIGS. 5 and 8 is directly secured as a short lever to the swivel lever 29, and preferably forms therewith a workpiece.

The actuating lever 30 according to FIG. 2 is mounted at the front of the wheelchair to pivot about an axis 38 on the adjacent side frame 13 and is connected by an actuating rod 39 to one end of the swivel lever 29; this actuating rod 39 may form a separate part or represent with the locking rod 32, a rod which is mounted at a pivotal point on the end of the swivel lever 29. The two actuating systems are to be operated by the person using the wheelchair, either at the front side of the chair, on the front edge of the seat 16 or in the centre of the side of the chair on the side edge of the seat 16.

Upon downward pressure on the operating lever 30, 31, the lever effects the pivoting of the lever 29 and the locking rods 32, 33, pivoted thereon are extended in opposite directions towards each other out of the locking openings 35 thereby enabling the gradual adjustment of the sides 20 and 21 with the arm 19 to be effected.

When the arm and side unit 19, 20, 21 is adjusted to the desired level, the locking rods 32, 33 automatically engage, on release of actuating lever 30, 31, by the force of the spring in the openings 35 — during the adjustment the actuating lever 30, 31 may be released so that the locking pins always rest against the wall of the guide members 22, or 20a by spring force.

The entire side and arm unit 27 is removably mounted on the wheelchair by its guide members 22 or 20a being drawn upwardly out of the guide sleeves 18.

The swivel lever 29 according to FIGS. 2 and 5 is mounted directly on the member 24 by means defining the axis 28 and the swivel lever 29 according to FIG. 8 is arranged with its axis 28 on a bearing member 40 secured to the member 24.

The arm 19 has, in plan view, a rectangular form and is formed as a strip, preferably a padded strip, plate or the like.

In the case of the arm 19 shown in a chain dotted embodiment in FIG. 4, the arm 19 has an enlargement 19b at its front end, extending into the vicinity of the wheel 10 and affords an enlarged supporting surface and, particularly in the lowered condition of the arm 19, allows for the space between the arm 19 and a surface, such as a bed, to be used by the handicapped person so that this person can slide from the seat 16 onto a bed or the like more easily by the supporting action of the arm enlargement 19b.

The lowerable side and arm unit 17 is also adjustable between limits in height and in one embodiment (not shown), a clamping, compression or screw device, or any other device, may be provided to secure same.

I claim:

1. A mobile invalid chair, containing:
   a foldable chassis formed by two side frames held at an adjustable distance from each other by a universal joint, said chassis carrying a seating surface and a back;
   an arm support provided in both side frames, each arm support having a side wall and arranged to be vertically displaceable as a unit, the arm support unit being lowerable with its upper resting surface to such an extent that it is in one plane with the seating surface, each arm support unit having vertical guide bars adapted to be lowered within vertical guide sleeves of said chassis, said guide sleeves being disposed with a clearance below said seat surface and secured to said chassis, said arm suppot unit comprising a U-shaped supporting stirrup with its shanks pointing downwardly, said stirrup supporting said arm support on the cross-piece of said stirrup, said side wall being secured to the outside of said supporting stirrup by securing means on the U-shanks, said arm support being formed by a ledge which is rectangular in plan and is provided in the front part of the chair with an outwardly extended enlargement projecting into the region exterior of said chassis; and
   spring-loaded locking pins mounted on said guide sleeves and engaging in recess of said guide bars, said pins being displaceable transversely to the direction of displacement of the guide bars and are pivotably connected by connecting levers to actuating levers mounted to pivot on the chassis.

2. A wheelchair as recited in claim 1, wherein said U-shanks of said supporting stirrup are bent outwardly at spaced intervals from the plane of vertical adjustment and on their outer sides have said side wall secured thereto.

3. A wheelchair as recited in claim 1, wherein said side wall is secured by fixing means to the outside of said U-shanks.

4. A wheelchair as recited in claim 1, wherein said cross piece of said supporting stirrup is provided with two said vertical guide members extending adjacent each other with a spaced interval therebetween, said guide members being displaceably mounted in said vertical guide sleeves secured to a horizontal supporting member of said chassis.

5. A wheelchair as recited in claim 3, wherein said vertical U-shanks of said supporting stirrup form guide members which displaceably engage in vertical guide sleeves secured to vertical members of said chassis, and wherein said guide sleeves are each provided on the outside with a slot extending in the longitudinal direction of said sleeve and receiving said fixing means of the side wall during the displacement of said arm and side unit.

6. A wheelchair as recited in claim 1, wherein said locking device associated with each arm and side unit is provided below the seat and has a double-armed lever mounted to pivot about a horizontal axis extending transversely to the direction of vertical displacement, said lever being connected to an actuating lever for effecting its pivotal movement and having at both its ends locking rods pivotably mounted thereon, one end of each rod being connected to said lever, said rods being displaceable in opposite directions during swivelling of said lever and engaging by its free end as a locking pin in locking openings provided at spaced intervals in a vertical direction in said vertical guide members.

7. A wheelchair as recited in claim 6, wherein the free end of each locking rod is displaceable in a second guide sleeve secured to the first guide sleeve and extending at right angles to said first sleeve and, by means of a spring member, is adapted to be brought to and held in the locking position.

8. A wheelchair as recited in claim 6, wherein said actuating lever is directly connected to the double-armed lever, and is disposed halfway down the chassis.

9. A wheelchair as recited in claim 6, wherein said actuating lever is journalled to pivot about an axis on the front of the chassis and is connected by an actuating rod to the double-armed lever.

* * * * *